United States Patent
Wang

(10) Patent No.: US 10,305,372 B2
(45) Date of Patent: May 28, 2019

(54) POWER CONVERSION DEVICE WITH SNUBBER CIRCUIT TO SUPPRESS SURGE VOLTAGE

(71) Applicant: FUJI ELECTRIC CO., LTD., Kawasaki (JP)

(72) Inventor: Haining Wang, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 15/819,208

(22) Filed: Nov. 21, 2017

(65) Prior Publication Data

US 2018/0097440 A1     Apr. 5, 2018

Related U.S. Application Data

(63) Continuation of application No. PCT/JP2016/082612, filed on Nov. 2, 2016.

(30) Foreign Application Priority Data

Dec. 9, 2015    (JP) ................................ 2015-240259

(51) Int. Cl.
*H02M 1/34* (2007.01)
*H02M 7/48* (2007.01)
(Continued)

(52) U.S. Cl.
CPC ............... *H02M 1/34* (2013.01); *H02M 1/32* (2013.01); *H02M 5/458* (2013.01);
(Continued)

(58) Field of Classification Search
CPC ..... H02M 1/32; H02M 1/34; H02M 2001/348
See application file for complete search history.

(56) References Cited

U.S. PATENT DOCUMENTS 4,545,464 A * 10/1985 Nomura .................... B66B 1/30
                                                    187/296
4,788,485 A * 11/1988 Kawagishi ............ H02M 1/425
                                                    318/807
(Continued)

FOREIGN PATENT DOCUMENTS

CN    203617893 U    5/2014
CN    103944366 A    7/2014
(Continued)

OTHER PUBLICATIONS

International Search Report dated Dec. 27, 2016 in corresponding International Patent Application No. PCT/JP2016/082612.
(Continued)

*Primary Examiner* — Yusef A Ahmed

(57) ABSTRACT

A power conversion device including: a power conversion circuit including a voltage control type first semiconductor switching element configured to convert DC power to polyphase AC power; a brake circuit including a voltage control type second semiconductor switching element configured to protect the power conversion circuit from an overvoltage applied to the power conversion circuit; a control circuit configured to control the first semiconductor switching element in the power conversion circuit and the second semiconductor switching element in the brake circuit; and a snubber circuit including a resistor and a capacitor that are connected between a negative potential side of the power conversion circuit and a negative potential side of the control circuit and are configured to suppress a surge voltage.

9 Claims, 3 Drawing Sheets

(51) Int. Cl.
    *H02M 5/458* (2006.01)
    *H02M 7/5387* (2007.01)
    *H02M 1/32* (2007.01)

(52) U.S. Cl.
    CPC ........... *H02M 5/4585* (2013.01); *H02M 7/48* (2013.01); *H02M 7/53871* (2013.01); *H02M 7/53875* (2013.01); *H02M 2001/348* (2013.01)

(56) References Cited

U.S. PATENT DOCUMENTS

| | | | | |
|---|---|---|---|---|
| 4,855,652 | A * | 8/1989 | Yamashita | H02M 1/4225 |
| | | | | 318/268 |
| 5,420,491 | A * | 5/1995 | Kanzaki | B66B 1/30 |
| | | | | 318/376 |
| 5,982,136 | A * | 11/1999 | Pelly | H02H 1/0007 |
| | | | | 318/801 |
| 5,995,384 | A * | 11/1999 | Majid | H02M 3/33523 |
| | | | | 323/902 |
| 7,737,533 | B2 | 6/2010 | Dai et al. | |
| 9,178,448 | B2 | 11/2015 | Ogawa | |
| 9,564,797 | B2 * | 2/2017 | Kagimura | H02M 5/4585 |
| 9,680,389 | B2 * | 6/2017 | Ichihara | H02M 5/4585 |
| 9,837,929 | B2 * | 12/2017 | Sakakibara | H02M 7/48 |
| 9,941,689 | B2 * | 4/2018 | Song | H02H 7/12 |
| 2004/0227479 | A1 * | 11/2004 | Youm | H02M 7/53875 |
| | | | | 318/375 |
| 2007/0291523 | A1 * | 12/2007 | Fukumoto | H02M 7/53806 |
| | | | | 363/134 |
| 2008/0036047 | A1 | 2/2008 | Dai et al. | |
| 2010/0109539 | A1 * | 5/2010 | Simi | H02M 7/53803 |
| | | | | 315/206 |
| 2010/0321965 | A1 * | 12/2010 | Sakakibara | H02M 5/4585 |
| | | | | 363/37 |
| 2012/0049829 | A1 * | 3/2012 | Murakami | H02M 1/32 |
| | | | | 323/288 |
| 2012/0275199 | A1 * | 11/2012 | Li | H02M 3/33507 |
| | | | | 363/21.15 |
| 2013/0114175 | A1 * | 5/2013 | Song | H02M 1/32 |
| | | | | 361/86 |
| 2013/0328514 | A1 * | 12/2013 | Funaba | H02P 27/08 |
| | | | | 318/519 |
| 2013/0335047 | A1 * | 12/2013 | Yamaguchi | G05F 1/468 |
| | | | | 323/282 |
| 2014/0159608 | A1 * | 6/2014 | Simi | H05B 33/0887 |
| | | | | 315/205 |
| 2014/0203740 | A1 * | 7/2014 | Ogawa | H02P 3/22 |
| | | | | 318/375 |
| 2015/0109832 | A1 * | 4/2015 | Heo | H02M 3/33507 |
| | | | | 363/21.18 |
| 2015/0207307 | A1 * | 7/2015 | Lin | H02H 7/1213 |
| | | | | 361/18 |
| 2017/0324316 | A1 * | 11/2017 | Araki | H02M 1/08 |
| 2018/0034378 | A1 * | 2/2018 | Lin | H02M 3/33523 |

FOREIGN PATENT DOCUMENTS

| | | |
|---|---|---|
| JP | 2003-146570 | 5/2003 |
| JP | 2010-500755 | 1/2010 |
| JP | 2010-136089 | 6/2010 |
| JP | 2012-188201 | 10/2012 |
| JP | 2014-138532 | 7/2014 |
| JP | 2014-150215 | 8/2014 |

OTHER PUBLICATIONS

English Translation by WIPO of the International Preliminary Report on Patentability in corresponding International Patent Application No. PCT/JP2016/082612, dated Jun. 21, 2018, 6 pgs.

Chinese Office Action dated Apr. 2, 2019 from Chinese Patent Application No. 201680032060.9, 11 pages.

\* cited by examiner

POWER CONVERSION DEVICE WITH SNUBBER CIRCUIT TO SUPPRESS SURGE VOLTAGE

CROSS-REFERENCE TO RELATED APPLICATIONS

This application is a continuation application filed under 35 U.S.C. § 111(a) of International Patent Application No. PCT/JP2016/082612, filed Nov. 2, 2016, which claims the foreign priority benefit under 35 U.S.C. § 119 of Japanese Patent Application No. 2015-240259, filed Dec. 9, 2015, the contents of which are incorporated herein by reference.

TECHNICAL FIELD

The present relates to a power conversion device having a power conversion circuit and a brake circuit.

BACKGROUND ART

Conventionally, power conversion devices, such as an inverter, have been applied to electric motors, vacuum cleaners, air conditioners, welding machines, and the like. In such a power conversion device, switching arms each of which has a high-potential-side semiconductor switching element and a low-potential-side semiconductor switching element connected in series are used. To these semiconductor switching elements, voltage control type semiconductor switching elements, such as an IGBT and a power MOS, have been applied.

As a power conversion device, a device including a rectifier circuit for converting AC power to DC power, a brake circuit, and an inverter circuit for converting DC power to AC power and control circuits therefor has been proposed (see PTL 1).

Recently, intelligent power modules in each of which a rectifier circuit, a brake circuit, and an inverter circuit and control circuits therefor are arranged in a single package are formed.

When an intelligent power module is configured as described above, wiring in the intelligent power module tends to be lengthened and wiring inductance tends to increase.

For this reason, when, for example, an IGBT, as a semiconductor switching element used for a brake circuit and an inverter circuit, is brought from an on-state to an off-state, an overvoltage (surge voltage) generated from stored energy stored in wiring inductance is supplied to between the gate, serving as a control terminal, and the emitter, serving as a low-potential-side terminal, of the IGBT.

In order to prevent the surge voltage from becoming higher than the breakdown voltage of the IGBT, setting up a surge voltage suppression circuit has been proposed as disclosed in PTL 2.

The surge voltage suppression circuit has a configuration including two Zener diodes that are connected in inverse series, that is, the anodes of both Zener diodes being connected to each other. The surge voltage suppression circuit is connected between the gate and emitter of the IGBT in parallel.

CITATION LIST

Patent Literature

PTL 1: JP 2014-138532 A
PTL 2: JP 2010-136089 A

SUMMARY OF INVENTION

Technical Problem

A case of applying a surge voltage suppression circuit disclosed in the afore-described PTL 2 to a power conversion device illustrated in FIG. 3 will be examined. The power conversion device converts AC power outputted from an AC power source 100 to DC by means of a full-wave rectifier circuit 101 and outputs the DC to a positive-electrode-side wiring 102$p$ and a negative-electrode-side wiring 102$n$. Between the positive-electrode-side wiring 102$p$ and the negative-electrode-side wiring 102$n$, a smoothing capacitor 103, a brake circuit 104, and an inverter circuit 105 are connected. To the AC output side of the inverter circuit 105, a three-phase electric motor 108 is connected. A reference sign 110 indicates a control circuit that switching-controls the respective switching elements in the brake circuit 104 and the inverter circuit 105.

Between an IGBT 106 constituting the brake circuit 104 and the negative-electrode-side wiring 102$n$, a surge voltage suppression circuit 111 is connected. The surge voltage suppression circuit 111 has a configuration including two Zener diodes ZD1 and ZD2 that are connected in inverse series. Similarly, between an IGBT 107 on the low potential side of each switching arm constituting the inverter circuit 105 and the negative-electrode-side wiring 102$n$, a surge voltage suppression circuit 112 having the same configuration as the surge voltage suppression circuit 111 is also connected.

As described above, when the surge voltage suppression circuit disclosed in PTL 2 is applied to the power conversion device having the brake circuit 104 and the inverter circuit 105, at least two surge voltage suppression circuits 111 and 112 need to be connected to the brake circuit 104 and the inverter circuit 105. In addition, there is a problem in that two Zener diodes ZD1 and ZD2 are used in each surge voltage suppression circuit and the Zener diodes ZD1 and ZD2 have large chip sizes and are expensive, which leads to a high manufacturing cost for the power conversion device.

Accordingly, the present invention has been made in view of the problem in the above-described conventional example, and an object of the present invention is to provide a power conversion device that is capable of suppressing influence from surge voltage generated between the control terminals and low-potential-side terminals of voltage control type semiconductor switching elements in a simple configuration.

Solution to Problem

In order to achieve the object mentioned above, according to an aspect of the present invention, there is provided a power conversion device including: a power conversion circuit including a voltage control type first semiconductor switching element configured to convert DC power to polyphase AC power; a brake circuit including a voltage control type second semiconductor switching element configured to protect the power conversion circuit from an overvoltage applied to the power conversion circuit; a control circuit configured to control the first semiconductor switching element in the power conversion circuit and the second semiconductor switching element in the brake circuit; and a snubber circuit including a resistor and a capacitor that are connected between a negative potential side of the power conversion circuit and a negative potential side of the control circuit and are configured to suppress a surge voltage.

Advantageous Effects of Invention

According to an aspect of the present invention, it is possible to suppress influence from surge voltage between the control terminals and low-potential-side terminals of semiconductor switching elements constituting a brake circuit and a power conversion circuit in a simple configuration.

BRIEF DESCRIPTION OF DRAWINGS

FIG. 2A is a waveform chart when an RC snubber circuit is not set up and FIG. 2B is a waveform chart when an RC snubber circuit is set up, respectively.

DESCRIPTION OF EMBODIMENTS

Next, an embodiment of the present invention will now be described with reference to the drawings. In the following description of the drawings, the same or similar reference signs are assigned to the same or similar portions.

In addition, the following embodiment indicates devices and methods to embody the technical idea of the present invention by way of example, and the technical idea of the present invention does not limit the materials, shapes, structures, arrangements, and the like of the constituent components to those described below. The technical idea of the present invention can be subjected to a variety of alterations within the technical scope prescribed by the claims described in Claims.

A power conversion device embodying one embodiment of the present invention will be described with reference to the drawings.

First, a power conversion device 10 according to the embodiment will be described using FIG. 1.

Figure 1:
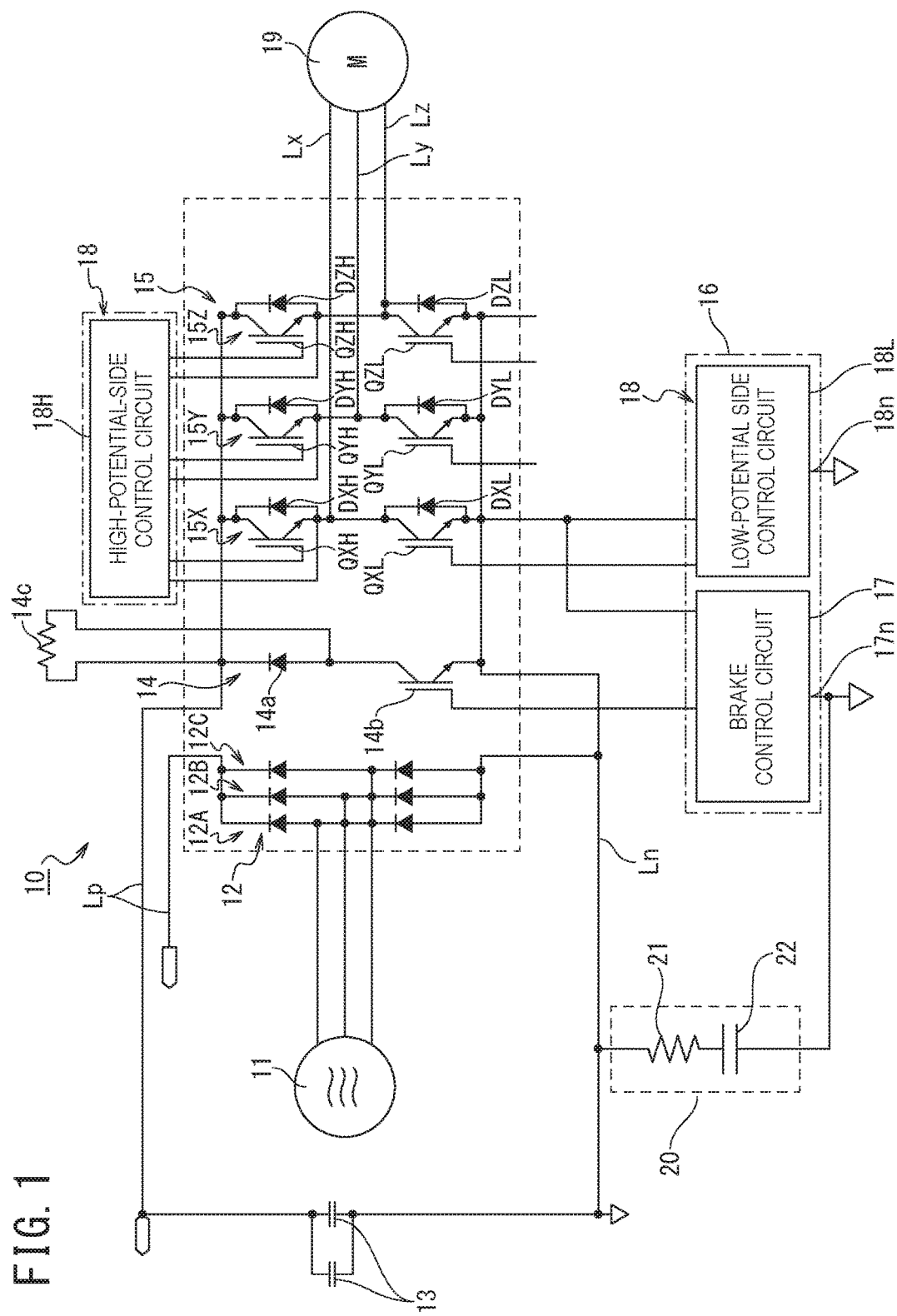
FIG. 1 is a circuit diagram illustrative of an embodiment of a power conversion device according to the present invention.

As illustrated in FIG. 1, the power conversion device 10 includes a full-wave rectifier circuit 12 that, as an AC-DC power conversion circuit, converts three-phase AC power inputted from a three-phase AC power supply 11 to DC power and smoothing capacitors 13 that smooths DC power outputted from the full-wave rectifier circuit 12.

The full-wave rectifier circuit 12 has a configuration including a full-bridge circuit in which series circuits 12A, 12B, and 12C are connected in parallel between a positive-electrode-side wiring Lp serving as a high-potential-side wiring and a negative-electrode-side wiring Ln serving as a low-potential-side wiring, each of the series circuits 12A, 12B, and 12C having two diodes connected in series. Phase power from the three-phase AC power supply 11 is supplied to a connection point between the diodes in each of the series circuits 12A, 12B, and 12C, and the phase power is full-wave rectified by the respective pairs of diodes to be outputted as DC power from between the positive-electrode-side wiring Lp and the negative-electrode-side wiring Ln.

The smoothing capacitors 13 are connected between the positive-electrode-side wiring Lp and the negative-electrode-side wiring Ln, to which DC power is outputted from the full-wave rectifier circuit 12, and smooth the DC power. The negative-electrode-side wiring Ln is connected to a ground at a connection point to the smoothing capacitors 13.

The power conversion device 10 also includes a brake circuit 14, an inverter circuit 15 serving as a power conversion circuit that converts DC to polyphase AC, and a control circuit 16.

In order to protect the inverter circuit 15 from overvoltage that is applied to the inverter circuit 15 when the inverter circuit 15 regeneratively brakes a three-phase motor 19 serving as a load, the brake circuit 14 is configured to consume a regenerative current by means of a resistor connected on the outside. The brake circuit 14 has a configuration including a diode 14a for surge voltage suppression, a voltage control type semiconductor switching element 14b configured with, for example, an IGBT, and an external resistor 14c connected to the diode 14a in parallel.

The cathode of the diode 14a and one end of the resistor 14c are connected to the positive-electrode-side wiring Lp, and a connection point between the anode of the diode 14a and the other end of the resistor 14c is connected to the high-potential-side terminal (collector) of the semiconductor switching element (IGBT) 14b. The low-potential-side terminal (emitter) and control terminal (gate) of the semiconductor switching element (IGBT) 14b are connected to the negative-electrode-side wiring Ln and the control circuit 16, which will be described later, respectively.

The inverter circuit 15 includes an X-phase switching arm 15X, a Y-phase switching arm 15Y, and a Z-phase switching arm 15Z. The X-phase switching arm 15X, the Y-phase switching arm 15Y, and the Z-phase switching arm 15Z are connected in parallel between the positive-electrode-side wiring Lp and the negative-electrode-side wiring Ln.

The X-phase switching arm 15X includes a high-potential-side semiconductor switching element QXH and a low-potential-side semiconductor switching element QXL that are connected in series between the positive-electrode-side wiring Lp and the negative-electrode-side wiring Ln. The high-potential-side semiconductor switching element QXH and the low-potential-side semiconductor switching element QXL are configured with, for example, IGBTs, which are voltage control type semiconductor switching elements. To the high-potential-side semiconductor switching element QXH, a freewheeling diode DXH is connected in inverse parallel. To the low-potential-side semiconductor switching element QXL, a freewheeling diode DXL is also connected in inverse parallel.

The Y-phase switching arm 15Y includes a high-potential-side semiconductor switching element QYH and a low-potential-side semiconductor switching element QYL that are connected in series between the positive-electrode-side wiring Lp and the negative-electrode-side wiring Ln. The high-potential-side semiconductor switching element QYH and the low-potential-side semiconductor switching element QYL are configured with, for example, IGBTs, which are voltage control type semiconductor switching elements. To the high-potential-side semiconductor switching element QYH, a freewheeling diode DYH is connected in inverse parallel. To the low-potential-side semiconductor switching element QXL, a freewheeling diode DYL is also connected in inverse parallel.

The Z-phase switching arm 15Z includes a high-potential-side semiconductor switching element QZH and a low-potential-side semiconductor switching element QZL that are connected in series between the positive-electrode-side wiring Lp and the negative-electrode-side wiring Ln. The high-potential-side semiconductor switching element QZH and the low-potential-side semiconductor switching element QZL are configured with, for example, IGBTs, which are voltage control type semiconductor switching elements. To the high-potential-side semiconductor switching element QZH, a freewheeling diode DZH is connected in inverse parallel. To the low-potential-side semiconductor switching element QZL, a freewheeling diode DZL is also connected in inverse parallel.

Connection points between the switching elements in the X-phase switching arm 15X, the Y-phase switching arm 15Y, and the Z-phase switching arm 15Z are connected to, for example, star-connected windings Lx, Ly, and Lz of the three-phase motor 19, serving as a load, respectively.

The control circuit 16 has a configuration including a brake control circuit 17 and an inverter control circuit 18. The brake control circuit 17 has a configuration including a gate drive unit (GDU) that drives the control terminal (gate) of the semiconductor switching element (IGBT) 14b in the brake circuit 14. The brake control circuit 17 keeps the semiconductor switching element (IGBT) 14b in the brake circuit 14 in an off-state when an inter-terminal voltage of the smoothing capacitors 13 is lower than a breakdown voltage of the semiconductor switching elements (IGBT) in the inverter circuit 15 or a preset voltage that is lower than the breakdown voltage. When the inter-terminal voltage of the smoothing capacitors 13 exceeds the preset voltage, the brake control circuit 17 turns the semiconductor switching element 14b on.

The inverter control circuit 18 has a configuration including a high-potential-side control circuit 18H and a low-potential-side control circuit 18L.

The high-potential-side control circuit 18H is arranged on the opposite side to the brake control circuit 17 in a module. The high-potential-side control circuit 18H supplies drive signals to the control terminals (gates) of the high-potential-side semiconductor switching elements QXH, QYH, and QYZ to switching-control the respective switching elements QXH, QYH, and QZH.

The low-potential-side control circuit 18L is arranged on the same side as and adjacent to the brake control circuit 17 in the module. The low-potential-side control circuit 18L supplies drive signals to the control terminals (gates) of the low-potential-side semiconductor switching elements QXL, QYL, and QZL to switching-control the respective switching elements QXL, QYL, and QZL.

A negative electrode terminal 17n of the brake control circuit 17 and a negative electrode terminal 18n of the low-potential-side control circuit 18L are connected to a ground.

Between the negative-electrode-side wiring Ln, serving as a negative potential side, and the negative electrode terminal 17n, serving as a negative potential side of the brake control circuit 17, an RC snubber circuit 20 as a surge voltage suppression circuit is connected. The RC snubber circuit 20 has a configuration including a resistor 21 and a capacitor 22 that are connected in series. The side of the RC snubber circuit 20 where the resistor 21 is located is connected to the negative-electrode-side wiring Ln, and the side where the capacitor 22 is located is connected to the negative electrode terminal 17n of the brake control circuit 17.

It is preferable to set a position of connection between the resistor 21 and the negative-electrode-side wiring Ln at a connection point to the low-potential-side terminal (emitter terminal) of a low-potential-side semiconductor switching element QiL (i=X, Y, or Z) at which wiring inductance is highest in the inverter circuit 15. In other words, if the width and thickness of the negative-electrode-side wiring Ln are assumed to be uniform, it is preferable to set the position of connection between the resistor 21 and the negative-electrode-side wiring Ln at a position in the vicinity of a connection point to the low-potential-side terminal (emitter terminal) of a low-potential-side semiconductor switching element QiL (i=X, Y, or Z) at which the wiring length of the negative-electrode-side wiring Ln to the connection point to the ground is longest. As described above, connecting the resistor 21 to a position at which the wiring length of the negative-electrode-side wiring Ln to the connection point to the ground is longest enables a maximum surge voltage suppression effect to be achieved.

The full-wave rectifier circuit 12, the brake circuit 14, the inverter circuit 15, and the control circuit 16 are arranged in a single package to constitute an intelligent power module (IPM).

Next, an operation of the above-described embodiment will be described.

AC power supplied from an AC power source on the outside is rectified by the full-wave rectifier circuit 12 to be converted to DC power. The DC power is smoothed by the smoothing capacitors 13 and supplied to the brake circuit 14 and the inverter circuit 15.

At this time, when the inverter circuit 15 is in a state of rotation-driving the three-phase motor 19, the inverter circuit 15 is switching-controlled by the high-potential-side control circuit 18H and the low-potential-side control circuit 18L in the inverter control circuit 18. In the meantime, since the inter-terminal voltage of the smoothing capacitors 13 does not reach the preset voltage, the semiconductor switching element 14b in the brake circuit 14 is kept in the off-state.

A case is considered where the low-potential-side semiconductor switching elements QXL to QZL turn off from an on-state in the inverter circuit 15. In this case, stored energy stored in the wiring inductance of the negative-electrode-side wiring Ln is supplied to between the control terminals and low-potential-side terminals of the low-potential-side semiconductor switching elements QXL to QZL as surge voltage.

At this time, the RC snubber circuit 20 is connected between the connection point of the negative-electrode-side wiring Ln at which the wiring inductance is highest and the connection point between the negative electrode terminal 17n of the brake control circuit 17 and the ground. For this reason, the surge voltage is to be suppressed by the capacitor 22 by way of the resistor 21 in the RC snubber circuit 20. Therefore, the surge voltage applied to the control terminals and low-potential-side terminals of the low-potential-side semiconductor switching elements QXL to QZL in the inverter circuit 15 may be suppressed.

The operation will be described in more detail using, as an example, a case where the low-potential-side semiconductor switching element QXL in the X-phase switching arm 15X has turned off from the on-state and caused a surge voltage due to stored energy in the wiring inductance to be generated.

Figure 2:
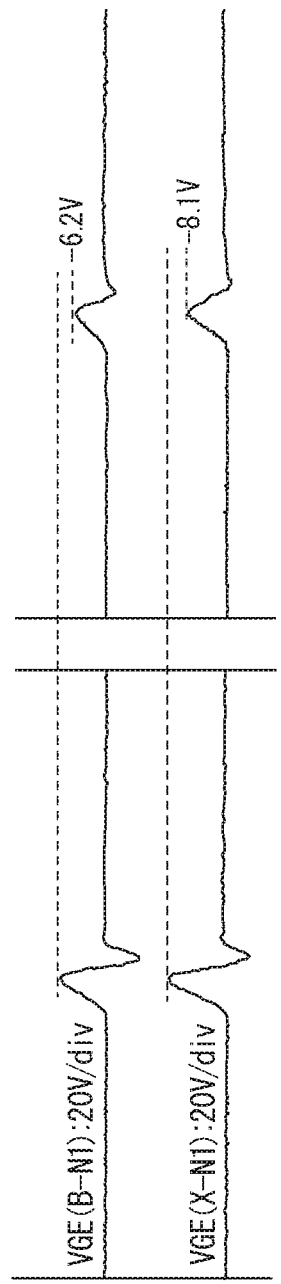
FIGS. 2A and 2B are waveform charts illustrative of surge voltage waveforms in a brake circuit and a power conversion circuit in FIG. 1.
Figure 3:
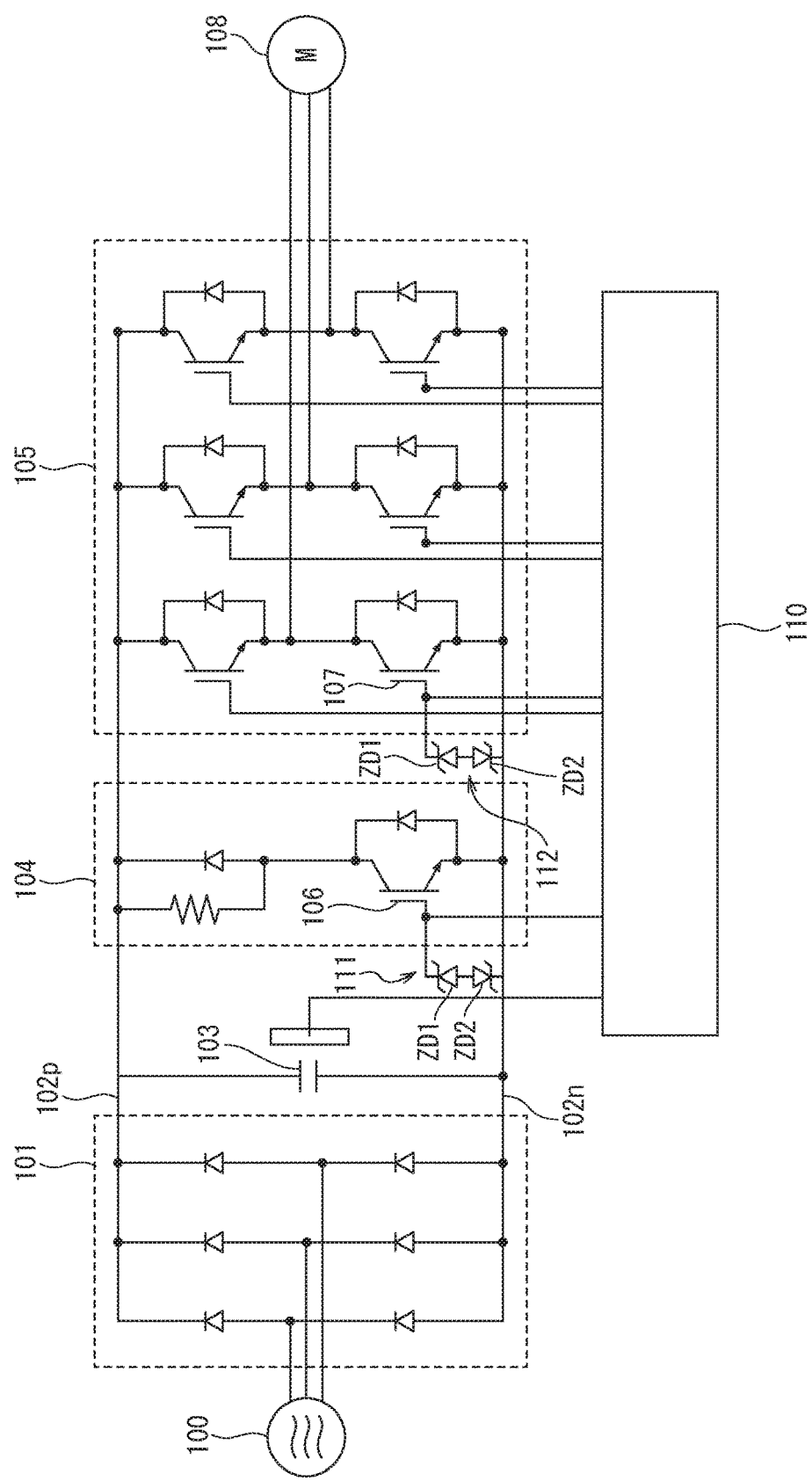
FIG. 3 is a circuit diagram illustrative of a conventional example of a power conversion device.

First, when the RC snubber circuit 20 is not set up, a voltage $V_{GE}$ (X−N1) between the control terminal and low-potential-side terminal of the low-potential-side semiconductor switching element QXL in the X-phase switching arm 15X reaches 20 V/div because of the surge voltage, as illustrated in FIG. 2A.

On the other hand, when the RC snubber circuit 20 is set up, stored energy stored in the wiring inductance of the negative-electrode-side wiring Ln is absorbed by the capacitor 22 byway of the resistor 21 in the RC snubber circuit 20. For this reason, the voltage $V_{GE}$ (X–N1) between the control terminal and low-potential-side terminal of the low-potential-side semiconductor switching element QXL in the X-phase switching arm 15X becomes 11.9 V, as illustrated in FIG. 2B.

The above result indicates that setting up the RC snubber circuit 20 enables the voltage $V_{GE}$ (X–N1) between the control terminal and low-potential-side terminal of the low-potential-side semiconductor switching element QXL to be reduced by 8.1 V compared with a case of not setting up the RC snubber circuit 20 and a large surge voltage suppression effect to be achieved.

Surge voltage generated in the negative-electrode-side wiring Ln is also applied to the semiconductor switching element 14b in the brake circuit 14. For this reason, a voltage $V_{GE}$ (B–N1) between the control terminal (gate terminal) and low-potential-side terminal (emitter terminal) of the semiconductor switching element 14b reaches 20 V/div, which exceeds the breakdown voltage, as illustrated in FIG. 2A.

On the other hand, setting up the RC snubber circuit 20 causes the surge voltage to be suppressed by the capacitor 22 in the RC snubber circuit 20, which enables the voltage $V_{GE}$ (B–N1) between the control terminal (gate terminal) and low-potential-side terminal (emitter terminal) of the semiconductor switching element 14b in the brake circuit 14 to be reduced to 13.8 V. Therefore, setting up the RC snubber circuit 20 enables the voltage $V_{GE}$ (B–N1) between the control terminal (gate terminal) and low-potential-side terminal (emitter terminal) of the semiconductor switching element 14b in the brake circuit 14 to be reduced by 6.2 V compared with a case of not setting up the RC snubber circuit 20.

A case of operating the inverter circuit 15 as a full-wave rectifier to regeneratively brake the three-phase motor 19 as a power generator will be described. In the regenerative braking state, AC power generated by the three-phase motor 19 is full-wave rectified by the inverter circuit 15 to be converted to DC power. For this reason, a case occurs where the inter-terminal voltage of the smoothing capacitors 13 increases to exceed the breakdown voltage of the respective semiconductor switching elements QXH to QZL, which constitute the inverter circuit 15.

At this time, when the inter-terminal voltage of the smoothing capacitors 13 exceeds the breakdown voltage or the preset voltage, which is lower than the breakdown voltage, the semiconductor switching element 14b in the brake circuit 14 is controlled to an on-state. For this reason, the inter-terminal voltage of the smoothing capacitors 13 is consumed through the external resistor 14c, which causes the increase in the inter-terminal voltage of the smoothing capacitors 13 to be suppressed. Therefore, the respective semiconductor switching elements QXH to QZL in the inverter circuit 15 may be protected.

When the inter-terminal voltage of the smoothing capacitors 13 is subsequently reduced to a voltage lower than the preset voltage, the semiconductor switching element 14b in the brake circuit 14 is controlled to an off-state. For this reason, a surge voltage due to stored energy stored in the wiring inductance of the negative-electrode-side wiring Ln is applied to the control terminal and low-potential-side terminal of the semiconductor switching element 14b.

In this case, the surge voltage generated in the negative-electrode-side wiring Ln is also suppressed by the capacitor byway of the resistor 21 in the RC snubber circuit 20. For this reason, application of surge voltage to the semiconductor switching element 14b in the brake circuit 14 and the low-potential-side semiconductor switching elements QXL to QZL in the inverter circuit 15 may be suppressed.

In the embodiment, a surge voltage suppression circuit has a simple configuration of, as described afore, only connecting a single RC snubber circuit 20 between a connection point of a negative-electrode-side wiring Ln at which wiring inductance is highest and a connection point between a negative electrode terminal of a brake control circuit and a ground. The configuration enables an increase due to surge voltage generated by the wiring inductance in voltage between the control terminals (gate terminals) and low-potential-side terminals (emitter terminals) of voltage control type semiconductor switching elements to be suppressed. In addition, the single RC snubber circuit 20 enables a larger surge voltage suppression effect to be achieved than a case of setting up surge voltage suppression circuits each having two Zener diodes connected in inverse series separately for a brake circuit and an inverter circuit.

In the above-described embodiment, a case of applying IGBTs as voltage control type semiconductor switching elements constituting the brake circuit 14 and the inverter circuit 15 was described. However, the present invention is not limited to the above-described configuration, and other voltage control type semiconductor switching elements, such as a power MOSFET, may be applied.

In the above-described embodiment, a case of applying the full-wave rectifier circuit 12 as a power conversion circuit that converts AC power to DC power was described. However, the present invention is not limited to the above-described configuration, and an AC-DC power conversion circuit that has the same configuration as the inverter circuit 15 may be applied in place of the rectifier circuit.

Furthermore, in the above-described embodiment, a case of setting up the full-wave rectifier circuit 12 that converts AC power to DC power was described. However, the present invention may be configured to, omitting the full-wave rectifier circuit 12, connect a DC power source, such as a battery, between the positive-electrode-side wiring Lp and the negative-electrode-side wiring Ln.

In the above-described embodiment, a case where the brake control circuit 17 and the inverter control circuit 18 constituted the control circuit 16 was described. However, the present invention is not limited to the above-described configuration, and the brake control circuit 17 and the inverter control circuit 18 may be configured to be incorporated into a single control circuit.

REFERENCE SIGNS LIST

10 Power conversion device
12 Full-wave rectifier circuit
13 Smoothing capacitor
14 Brake circuit
14a Diode
14b Semiconductor switching element
14c Resistor
15 Inverter circuit
15X X-phase switching arm
15Y Y-phase switching arm
15Z Z-phase switching arm QXH to QZH High-potential-side semiconductor switching element
QXL to QZL Low-potential-side semiconductor switching element
16 Control circuit
17 Brake control circuit
18 Inverter control circuit
18H High-potential-side control circuit
18L Low-potential-side control circuit
20 RC snubber circuit
21 Resistor
22 Capacitor

The invention claimed is:

1. A power conversion device, comprising:
a power conversion circuit including a voltage control type first semiconductor switching element configured to convert DC power to polyphase AC power;
a brake circuit including a voltage control type second semiconductor switching element configured to protect the power conversion circuit from an overvoltage applied to the power conversion circuit;
a control circuit configured to control the first semiconductor switching element in the power conversion circuit and the second semiconductor switching element in the brake circuit; and
a snubber circuit including a resistor and a capacitor that are connected between a negative potential side of the power conversion circuit and a negative potential side of the control circuit and are configured to suppress a surge voltage generated due to turn-off of the first semiconductor switching element of the power conversion circuit, wherein
a first end of the resistor is connected to the negative potential side of the power conversion circuit,
a second end of the resistor is connected to a first end of the capacitor, and
a second end of the capacitor is connected to a negative electrode terminal of a brake control circuit.

2. The power conversion device according to claim 1, wherein
the power conversion circuit, the brake circuit, the control circuit, and the snubber circuit are integrally arranged in a single package.

3. The power conversion device according to claim 2, wherein
the power conversion circuit includes switching arms for three or more phases that are connected in parallel with one another, each of the switching arms including a high-potential-side semiconductor switching element and a low-potential-side semiconductor switching element that are connected in series with each other, and
the snubber circuit is connected between a connection portion connected to a low-potential-side terminal of a low-potential-side semiconductor switching element among low-potential-side semiconductor switching elements constituting the switching arms and a low-potential-side wiring of the control circuit, the connection portion being a portion at which wiring inductance of a low-potential-side wiring to which low-potential-side terminals of the low-potential-side semiconductor switching elements are connected is highest among the low-potential-side semiconductor switching elements.

4. The power conversion device according to claim 3 further comprising
an AC-DC power conversion circuit configured to convert AC power to DC power, wherein
DC power outputted from the AC-DC power conversion circuit is supplied to the brake circuit and the power conversion circuit.

5. The power conversion device according to claim 2 further comprising
an AC-DC power conversion circuit configured to convert AC power to DC power, wherein
DC power outputted from the AC-DC power conversion circuit is supplied to the brake circuit and the power conversion circuit.

6. The power conversion device according to claim 1, wherein
the power conversion circuit includes switching arms for three or more phases that are connected in parallel with one another, each of the switching arms including a high-potential-side semiconductor switching element and a low-potential-side semiconductor switching element that are connected in series with each other, and
the snubber circuit is connected between a connection portion connected to a low-potential-side terminal of a low-potential-side semiconductor switching element among low-potential-side semiconductor switching elements constituting the switching arms and a low-potential-side wiring of the control circuit, the connection portion being a portion at which wiring inductance of a low-potential-side wiring to which low-potential-side terminals of the low-potential-side semiconductor switching elements are connected is highest among the low-potential-side semiconductor switching elements.

7. The power conversion device according to claim 6 further comprising
an AC-DC power conversion circuit configured to convert AC power to DC power, wherein
DC power outputted from the AC-DC power conversion circuit is supplied to the brake circuit and the power conversion circuit.

8. The power conversion device according to claim 1 further comprising
an AC-DC power conversion circuit configured to convert AC power to DC power, wherein
DC power outputted from the AC-DC power conversion circuit is supplied to the brake circuit and the power conversion circuit.

9. A power conversion device, comprising:
a power conversion circuit including a voltage control type first semiconductor switching element configured to convert DC power to polyphase AC power;
a brake circuit including a voltage control type second semiconductor switching element configured to protect the power conversion circuit from an overvoltage applied to the power conversion circuit;
a control circuit configured to control the first semiconductor switching element in the power conversion circuit and the second semiconductor switching element in the brake circuit; and
a snubber circuit including a resistor and a capacitor that are connected in series between a negative potential side of the power conversion circuit and a negative potential side of the control circuit and are configured to suppress a surge voltage,
wherein
the resistor is directly connected to the negative potential side of the power conversion circuit; and
the capacitor is directly connected to the negative potential side of the control circuit.

* * * * *